April 1, 1952  A. J. WEST  2,591,483
PROGRESSIVE TOOL AND IMPROVED METHOD OF PROGRESSIVELY
FORMING ARTICLES FROM STRIP STOCK OR THE LIKE
Filed May 1, 1944  9 Sheets-Sheet 1

INVENTOR
ALBERT J. WEST
ATTY.

Fig. 2

INVENTOR
ALBERT J. WEST
ATTY.

Fig. 3

INVENTOR
ALBERT J. WEST
ATTY.

Patented Apr. 1, 1952

2,591,483

UNITED STATES PATENT OFFICE 2,591,483

PROGRESSIVE TOOL AND IMPROVED METHOD OF PROGRESSIVELY FORMING ARTICLES FROM STRIP STOCK OR THE LIKE

Albert J. West, Oglesby, Ill., assignor to General Time Corporation, New York, N. Y., a corporation of Delaware Application May 1, 1944, Serial No. 533,612

13 Claims. (Cl. 59—6)

This invention relates to a progressive tool, and to an improved method of progressively forming articles from strip stock or the like. The method and apparatus which comprise this invention are particularly adapted for forming links of the type which are used to constitute cartridge belts, and in which method and apparatus, successive operations are simultaneously performed on different blanks, or on different portions of the stock, as they progress through the tool.

The particular embodiment of this invention herein shown and described is directed to a method and to an apparatus, in the form of a die set, for forming a cartridge belt link in the form of a strip of metal which has first been slit and then expanded so as to provide two or more ring-shaped portions disposed along two spaced parallel axes. The particular cartridge belt link herein shown consists of three rings, the two outer rings being spaced from each other along one of said axes and adapted to receive a cartridge, and the intermediate ring being disposed along the other of said axes, and being also adapted to receive a cartridge. It will be seen that these links are interfitting; the intermediate ring of one link fits between the outer rings of an adjacent link, so that the axes thereof are common. A cartridge fitted in these three aligned links will thereupon serve in the manner of a hinge pintle to hold the adjacent links together, the links being so formed as to permit of a hinge action. As the cartridges are removed, as by the automatic feeding mechanism of a machine gun, the separate links drop off one by one.

One object of this invention, therefore, is to provide a method for the manufacture of an improved cartridge belt link or like articles which may be utilized by a die set, and to provide an improved die set which will perform not only the preliminary punching operations on the strip stock, but also a plurality of forming operations after the severance of the punched blank from the strip stock.

Another object is to provide an improved method for the automatic production, from intermittently advanced strip stock, of articles having re-entrant portions by means of blanking and forming operations.

Still another object is to provide an improved die set which embodies means for imparting lateral motion to certain parts thereof whereby the work may be subjected to a plurality of successive forming operations in which the forming pressure is applied in different directions.

It is an object of this invention to provide a method and the apparatus in which certain preliminary operations are performed on an intermittently advanced strip before blanks are severed therefrom, and then to perform a first forming operation upon a blank as it is being severed from the strip, and then to displace the blank into a position wherein it may be subjected to a final forming operation. The apparatus and method which form this invention are well adapted for any type of forming operation to be performed on the intermittently advanced sheet or strip stock, which forming operation requires two or more forming steps upon a severed blank.

Previous methods of forming cartridge belt links have resulted in a link provided with free ends which are curled up into the respective cartridge engaging rings. Such a construction requires stock of high carbon steel, in order that the rings may retain their set or deformation, that is, to prevent their uncurling when the belt is tensioned. It is an object of this invention to provide a method and apparatus for forming cartridge belt links which have no free ends, and therefore in which no particular set or deformation of the steel is necessary to provide the desired operating characteristics. Therefore the method herein described permits the use of less costly, and more easily worked mild steel.

It is a further object of this invention to provide an improved method for the manufacture of cartridge belt links from strip stock in which there is a minimum of scrap.

Still another object is to provide an improved apparatus and method for the manufacture of cartridge belt links wherein all burs resulting from slitting operations and the like are on the outside of the rings, in a position where a cartridge will not be damaged by such burs.

A further object is to provide an improved apparatus and method for engaging a partially formed article, after it has been stripped from one set of dies and displacing it into a position from which it may later be moved into a position wherein it may be subjected to the action of a second set of dies.

Other objects, features, and advantages will become apparent as the description proceeds.

With reference now to the drawings which form a part of this specification, and in which like reference numerals designate like parts—

Fig. 14 is a sectional detail taken along line 14—14 of Fig. 10;

Figure 1:
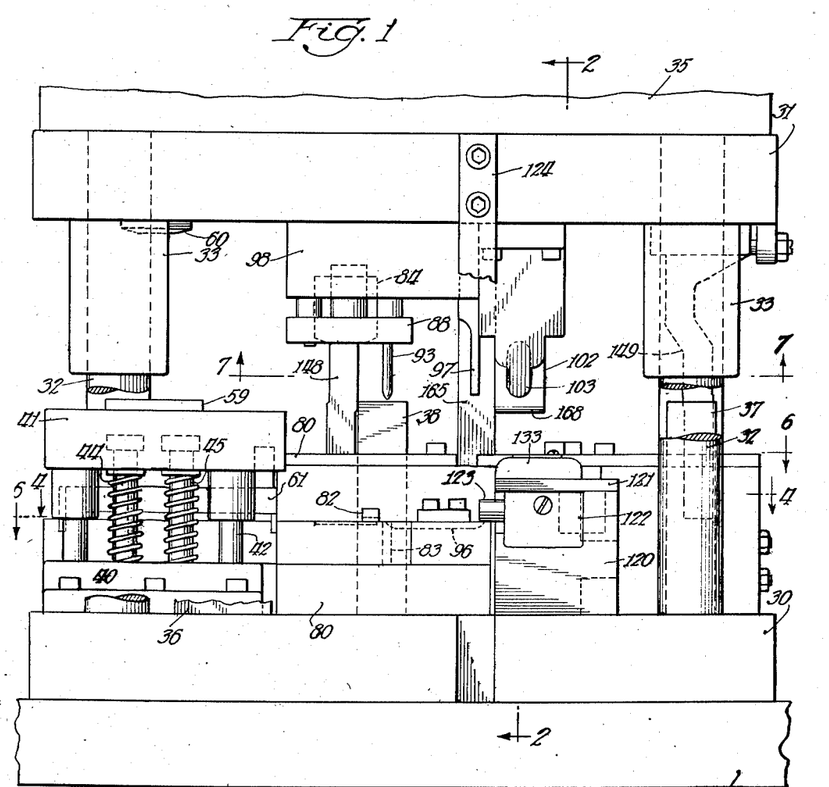
Fig. 1 is an elevation of a preferred embodiment of this invention, the die set shown being in the elevated position.
Figure 6:
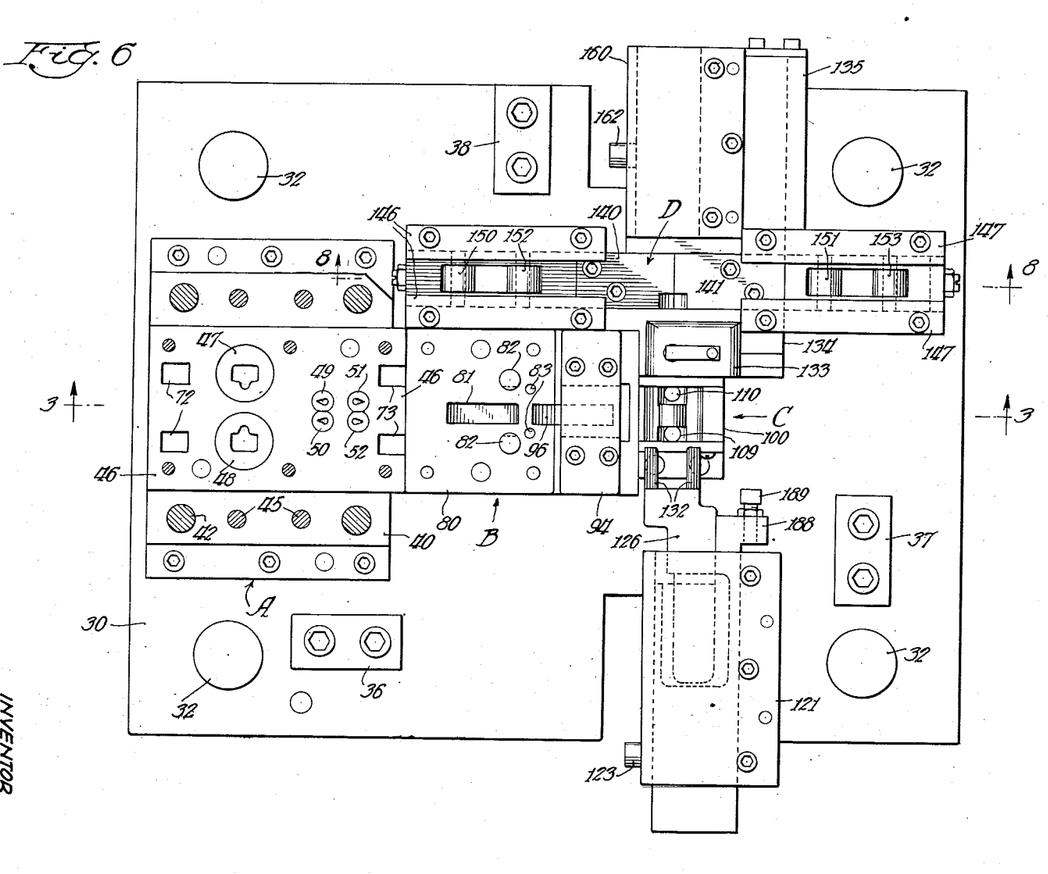
Fig. 6 is a plan view of the lower portion of the die, this view being taken substantially along the line 6—6 of Fig. 1.
Figure 7:
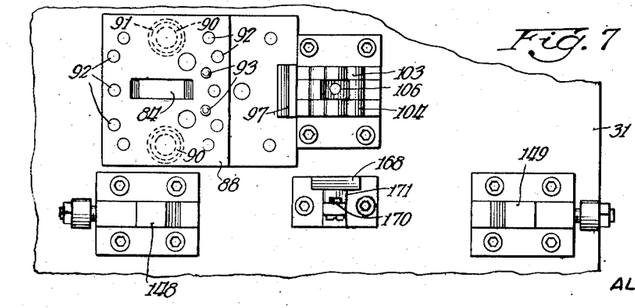
Fig. 7 is a bottom view of a drawing of the punch, taken along line 7—7 of Fig. 1.

With reference now to Figs. 1 and 6, the tool comprises a four-post die set having a die bed 30, and a cooperating punch holder 31 in spaced relation thereto. The die bed 30 is provided with die posts 32 which extend upwardly at the four corners thereof, and are received within bushings 33 which depend from the punch holder. The punch holder is also apertured so that there is full vertical movement as it slides up and down on the posts 32. The die bed 30 rests upon a bolster plate 34 of a press, and the upper surface of the punch plate 31 is adapted to be engaged by a press plate 35 of a press. Safety blocks 36, 37 and 38 are provided at various points, as shown in Fig. 6, which prevent damage to the apparatus by limiting the movement of the punch holder.

The general arrangement of the die set is best shown in Fig. 6 which is a plan view of the parts directly associated with the die bed 30. The die set comprises four stations which are generally designed by letters, and these are the piercing station A, the slit and cut off station B, the first forming station C, and the second forming station D.

Figures 4, 13:
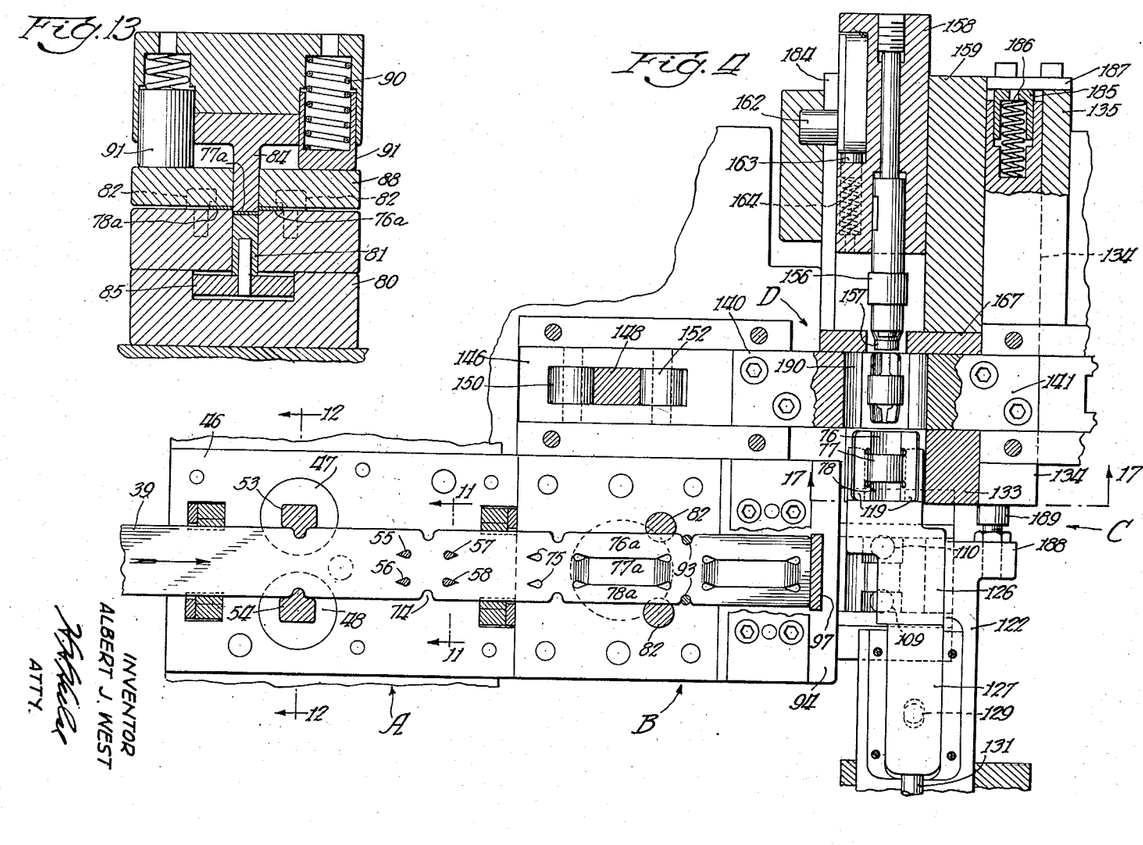
Fig. 4 is a plan view, partially in section, taken substantially along the line 4—4 of Fig. 1.
Fig. 13 is a sectional detail taken along line 13—13 of Fig. 3.

In general, the operation of the tool is best shown in Fig. 4. Strip stock 39 is fed intermittently into the piercing station A by suitable feeder means not shown. The stock is notched on the sides, and four teardrop holes are pierced therein in this station.

As the stock is advanced into the slit and cut off station B, the stock is slit between the two pairs of teardrops, and the middle portion thereof is offset downwardly from the side portions.

Figures 17, 18, 19, 20, 21, 22, 23:
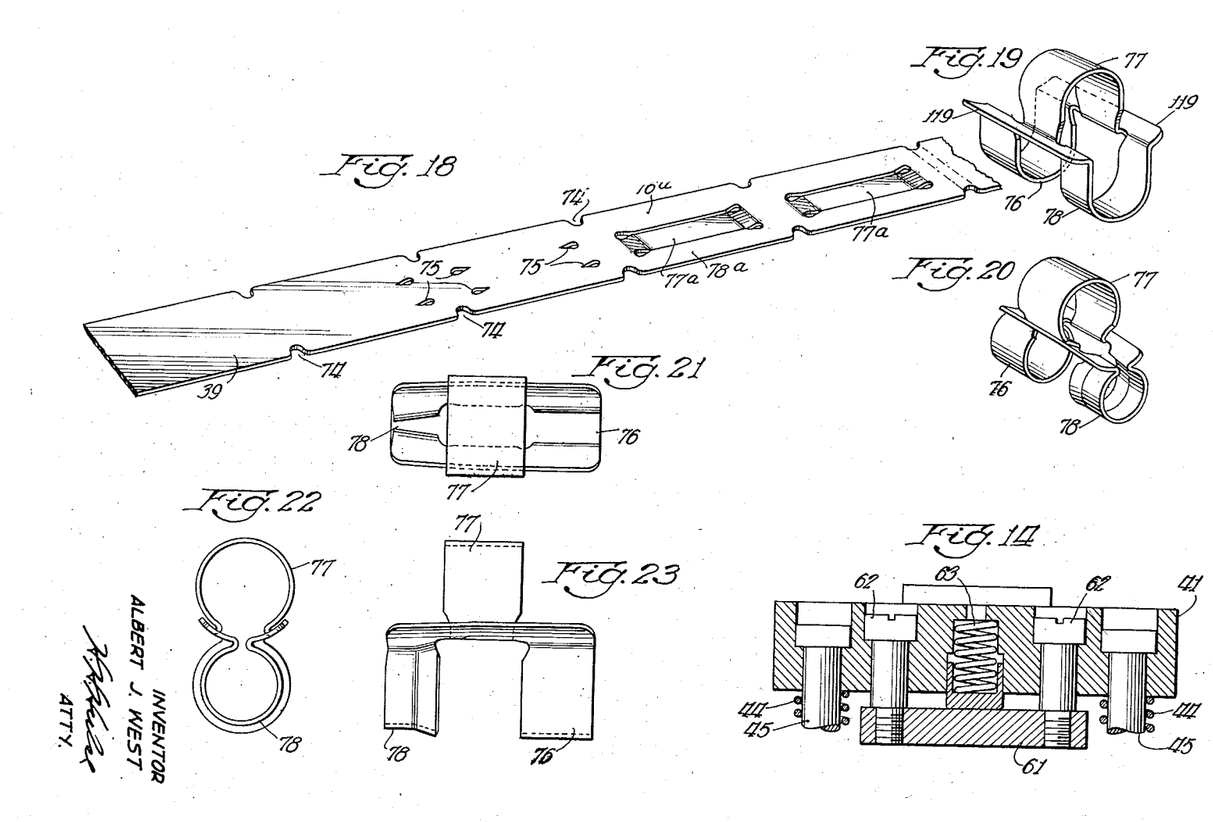
Fig. 18 is a perspective view of strip stock after the piercing and slitting operations.
Fig. 19 is a perspective view of a partially formed link.
Fig. 20 is a perspective view of the finally formed belt link.
Fig. 21 is a plan view of the link shown in Fig. 20.
Fig. 22 is an end view of the same.
Fig. 23 is an elevation of the same.

The stock is then advanced until on the second succeeding operation the slit portion of the strip is disposed in the first forming station C, and the outer edges of the metal are forced downwardly and the central offset portion is forced upwardly to form the "first formed part" shown in Fig. 19. At the same time, the blank is severed from the preceding portion of the strip. As the first formed part is stripped from the punch and die which constitute the first forming station, it is pushed over into a carrier block 133 by a fork-shaped pusher 126. As each succeeding first formed part is pushed from the first forming station, it forces the first mentioned part before it from the carrier block into the final form station.

The final form station comprises a pair of jaws 140 and 141 which cooperate with arbors 156 and 157 to impart the final form to the blank. As the jaws 140 and 141 come together, the metal is forced to take the shape of the finished link, shown in Figs. 20 to 23 inclusive. As the jaws open up and the arbors are retracted, the finished link falls through an opening in the die bed and bolster plate into a suitable container not shown which is disposed beneath the press.

Figure 9:
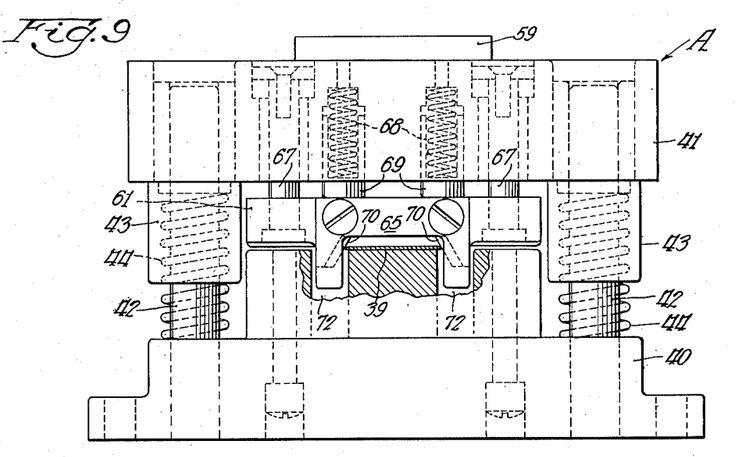
Fig. 9 is an end view of the piercing unit assembly.
Figure 10:
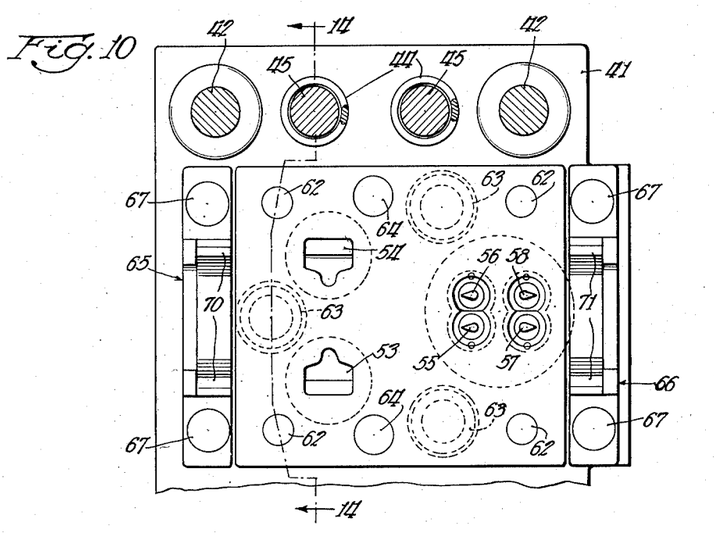
Fig. 10 is a bottom view of the upper member of the piercing unit assembly on line 10—10 of Fig. 3.

The piercing unit A will first be described in detail. This constitutes a piercing bed plate 40 which is mounted on die bed 30. A piercing punch holder 41 (Fig. 9) is positioned above the piercing bed plate 40, and is maintained in aligned relationship by means of the posts 42, and bushings 43. The piercing punch holder 41 is held in elevated position by means of springs 44 which surround stripper screws 45 whereof the heads engage the piercing punch holder 41 to limit the upward movement thereof. The parts of the piercing unit as a whole are best shown in Figs. 9 and 10, and Fig. 14 shows in detail the stripper screws 45 and the springs 44.

Figures 11, 12:
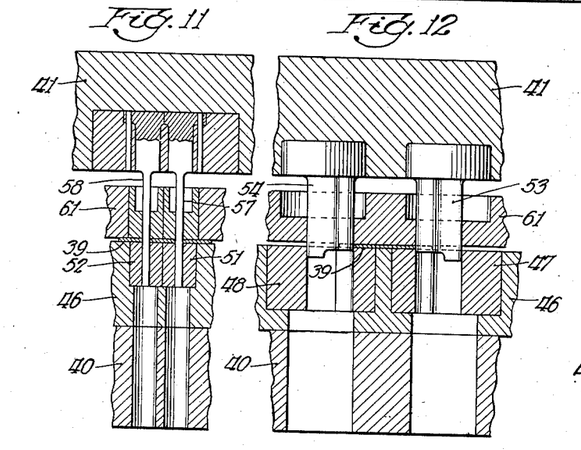
Fig. 11 is a sectional detail taken along line 11—11 of Fig. 4.
Fig. 12 is a sectional detail taken along line 12—12 of Fig. 4.

A die block 46 is mounted on the piercing bed plate 40 and is provided with notching dies 47, 48 and teardrop dies 49, 50, 51 and 52 (Figs. 11 and 12). Notching punches 53 and 54, and teardrop punches 55, 56, 57 and 58 are suitably mounted in the piercing punch holder 41 and cooperate with their respective dies. The term die as used herein refers to the female member, and the term punch to the male member.

A hardened plate 59 is secured to the upper surface of the piercing punch holder 41, and is adapted to be engaged by an adjusting screw 60 (Fig. 3), mounted in punch holder 31. The movement of the piercing punch holder 41 is much less than that of the punch holder 31 so as the latter approaches its lowered position, it will engage the piercing punch holder 41, by means of the adjusting screw 60 and the hardened plate 59, and cause operation of the piercing unit A.

The stripper plate 61 is provided for the piercing punch holder 41, and through which the punches 53 to 58 inclusive extend. The stripper plate is mounted on stripper screws 62 which take into the piercing punch holder 41, as shown in Fig. 14, and springs 63 bear against the stripper plate 61 to cause the stripping action. Reference to Fig. 10 will indicate that four stripper screws 62 and three springs 63 are provided in order to obtain balanced action of stripper plate. A plurality of guides 64 are also provided to maintain the stripper plate in centered relationship, thereby avoiding wear on the punches.

The relationship of the stripper plate to the teardrop punches and other elements is shown in detail in Fig. 11, and the relationship of the stripper plate with the notching punches is shown in detail in Fig. 12. It will be seen that after a blank section of the strip stock 39 has been advanced into the piercing unit A, that the down stroke of the punch holder 31 will cause operation of the piercing punch holder 41, thereby forming notches 74 and teardrop holes 75 in the strip stock 39, as shown in Fig. 18. As the punch holder 31 ascends, the springs 44 will cause the piercing punch holder 41 to ascend, but the stripper plate 61 remains in engagement with the strip stock 39 until such time as the punches 53 to 58 inclusive have been stripped from the notches 74 and teardrop holes 75.

The position of the strip as it advances through the piercing unit A is determined by stock guides 65 and 66, adjacent the ends of the stripper plate 61. The stock guides are mounted from the piercing punch holder 41 by means of pins 67 as shown in Fig. 9 with respect to the stock guide 65. Springs 68, received within the piercing punch holder 41, and bearing against cup-shaped plungers 69, which in turn engage the stock guide 65, serve to urge the stock guide downwardly.

Each stock guide is provided with a pair of equalizers 70 and 71 respectively, which are in the form of plates of hardened steel disposed at a considerable angle to the surface of the strip stock 39. As the piercing punch holder 41 descends, the strip equalizers engage the strip before the punches, and serve to center the strip before it is pierced.

The die block 46 is mortised as indicated by reference numerals 72 and 73 in Fig. 6 to accommodate the U-shaped stock guides 65 and 66, respectively.

As the strip stock 39, therefore, travels through the piercing station A, it is first centered by the equalizer plates, then engaged by the stripper plate 61, and then punched to receive the notches 74 and the tear drop holes 75, these being shown in Fig. 18.

The slitting and cut-off station B is located adjacent the piercing station A, and is provided with means to slit the stock between the two pairs of tear drop holes. The parts of the slitting station B are shown in their raised position in Fig. 1. The slitting mechanism comprises a die block 80, shown also in Fig. 6, which is provided with a slitting die 81. Strip guides 82, in the form of slabbed pins, project upwardly from the die block 80, and serve to direct the strip stock in its progress through the apparatus. The die block is also provided with pilot bores 83.

A punch plate 98 is mounted from the punch holder 31, and carries a slitting punch 84 for cooperation with the slitting die 81, and pilot pins 93 for cooperation with the pilot bores 83. A strip knock-out 85 is disposed within the slitting die 81, and is mounted on plungers 86 which are received in bores in the die block 80 and the die bed 30. Springs 87, also mounted in the bores, engage the plungers so as to cause the strip stock 39 to be knocked out of the die as the slitting punch is raised.

A stripper plate 88 is also mounted from the punch plate 98 by means of suitable stripper screws, not shown herein. The stripper plate is maintained in centered and parallel position with respect to the other parts by means of guide pins 92. The plate is urged downwardly by means of coil springs 90, disposed within a bore in the punch plate 98, which springs engage cup-shaped plungers 91 which bear against the stripper plate, as shown in Fig. 13.

As the punch holder 31 descends, the pilot pins 93 will pass through the notches 74 of the strip stock 39, thereby centering the strip stock and holding it secure against further movement. Further descent of the punch holder will cause the strip stock to be provided with two slits which connect the pairs of tear drop holes 75. By this operation, the blank is divided into three portions, 76a, 77a and 78a, as shown in Fig. 18, the central portion 77a being offset downwardly.

Figure 3:
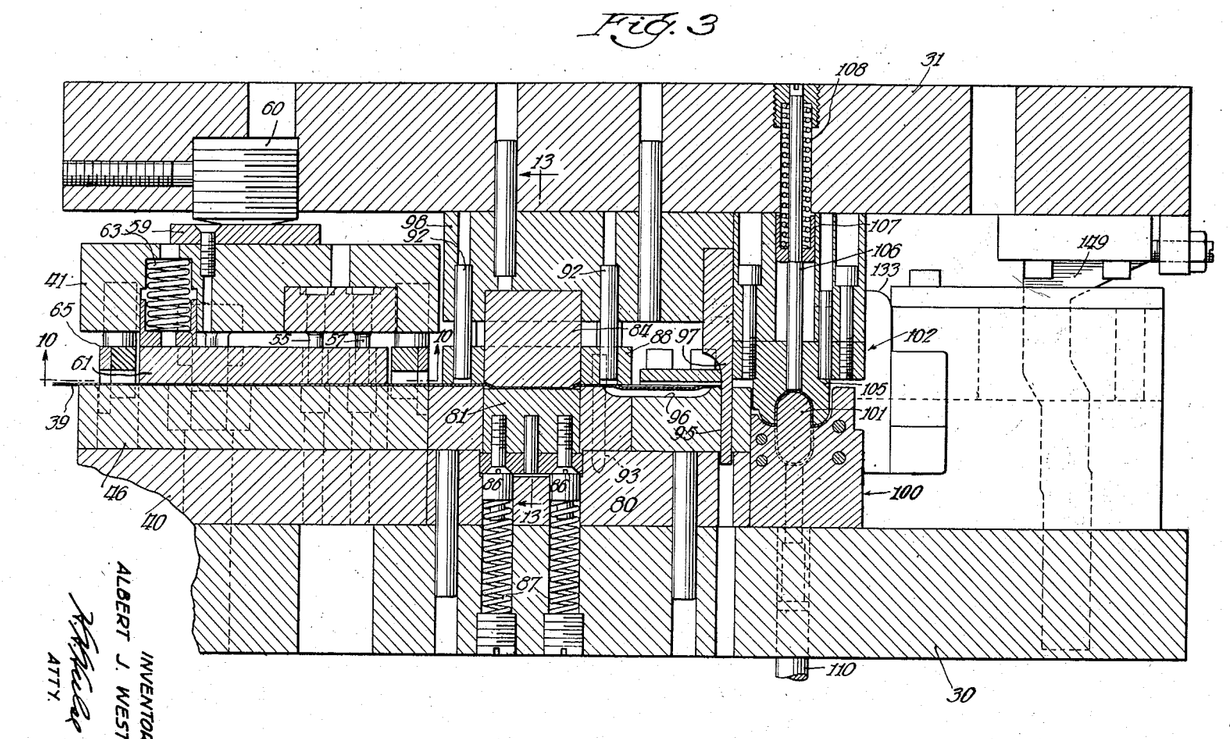
Fig. 3 is a sectional elevation taken along line 3—3 of Fig. 6, but showing the complete apparatus in its lowered position.

As the punch holder 31 ascends, the strip stock is advanced to a second position in the slit and cut-off station B, in which position it rests on a die block 94 having a cut-off die 95. The punch plate 98 also carries a cut-off punch 97, as shown in Fig. 3, which causes the blanks to be severed from the strip stock. It will be noted that the die block 94 is recessed as indicated at 96 to accommodate the offset center portion 77a.

Adjacent the slit and cut-off station B is the first forming station C. This comprises a lower forming die 100 and an upper forming punch 102 which is mounted on the punch holder 31. The upper forming punch includes two punch parts 103 and 104, which cooperate with corresponding die portions of the lower forming die 100 to form portions 78a and 76a, respectively, into two loops. The two punch portions are separated by a central recessed die portion 105, which cooperates with a corresponding punch part 101 mounted on the lower forming die 100, so that the central portion 77a of the blank may be looped upwardly. A push-out pin 106, as shown in Fig. 3, is mounted in the upper forming punch 102, and is urged downwardly by a spring 108, received in a bore in the punch holder 31, and engaging a cup-shaped bushing 107 slidingly mounted in a corresponding bore in the upper portion of the upper forming punch 102, this cup-shaped bushing being secured to the push-out pin 106. As the upper forming punch is elevated, the partially formed blank may be stripped from the upper forming punch by the action of the push-out pin 106.

Figure 2:
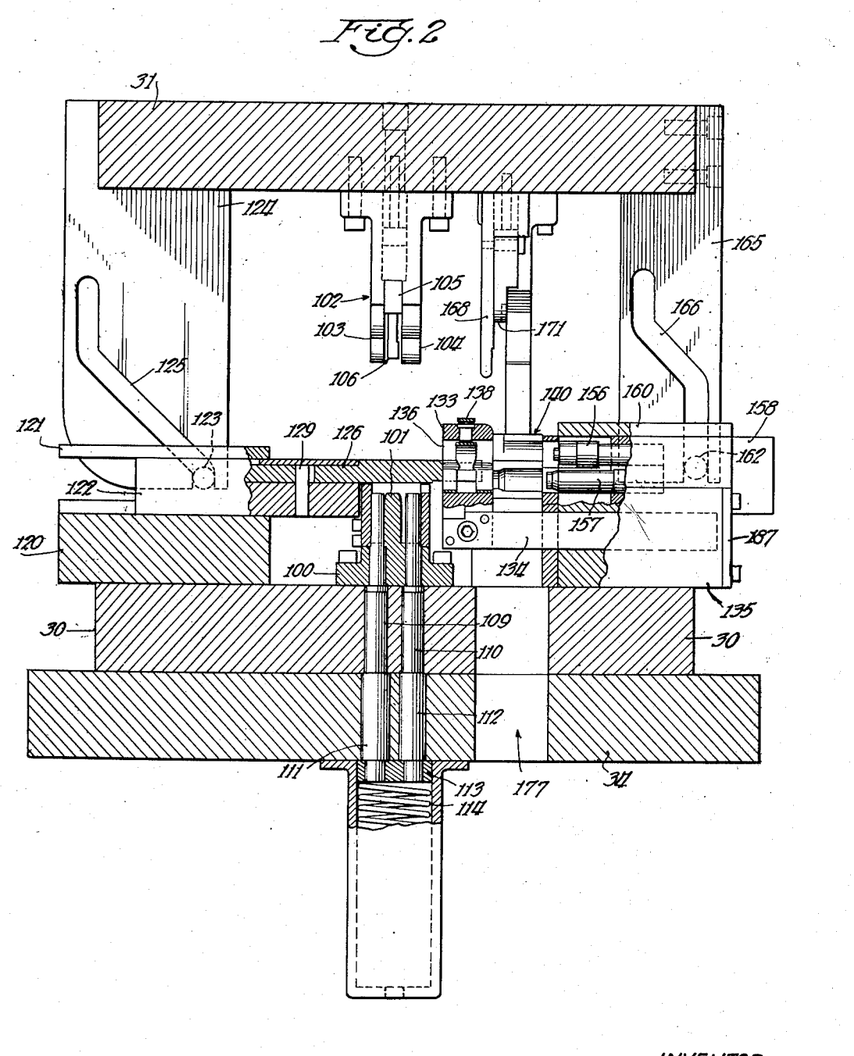
Fig. 2 is a sectional elevation taken along line 2—2 of Fig. 1.

Plungers 109 and 110 are provided in the lower forming die 100, as shown in Figs. 2 and 3, to engage the outer loops of the partially formed blank, and to strip it from the lower forming die. These stripping plungers are engaged by bolster pins 111 and 112, which are slidably mounted in the bolster plate 34 of the press. At their lower ends they are connected to each other by a connector plate 113, which is engaged by a spring 114 mounted in a bolster housing 115 secured to the under side of the bolster plate. It will be seen that as the blank is formed by the members 100 and 102, the plungers 109 and 110 will yield, due to their resilient mounting. On the up stroke of the press, however, they cause the partially formed blank to be stripped from the lower form die 100, and to be held in a position wherein it may be engaged by pusher jaws 132 and displaced sideways, so as to leave the first forming station free for the reception of another blank.

The construction and operation of the pusher mechanism will next be described.

Figures 5, 15, 16, 17:
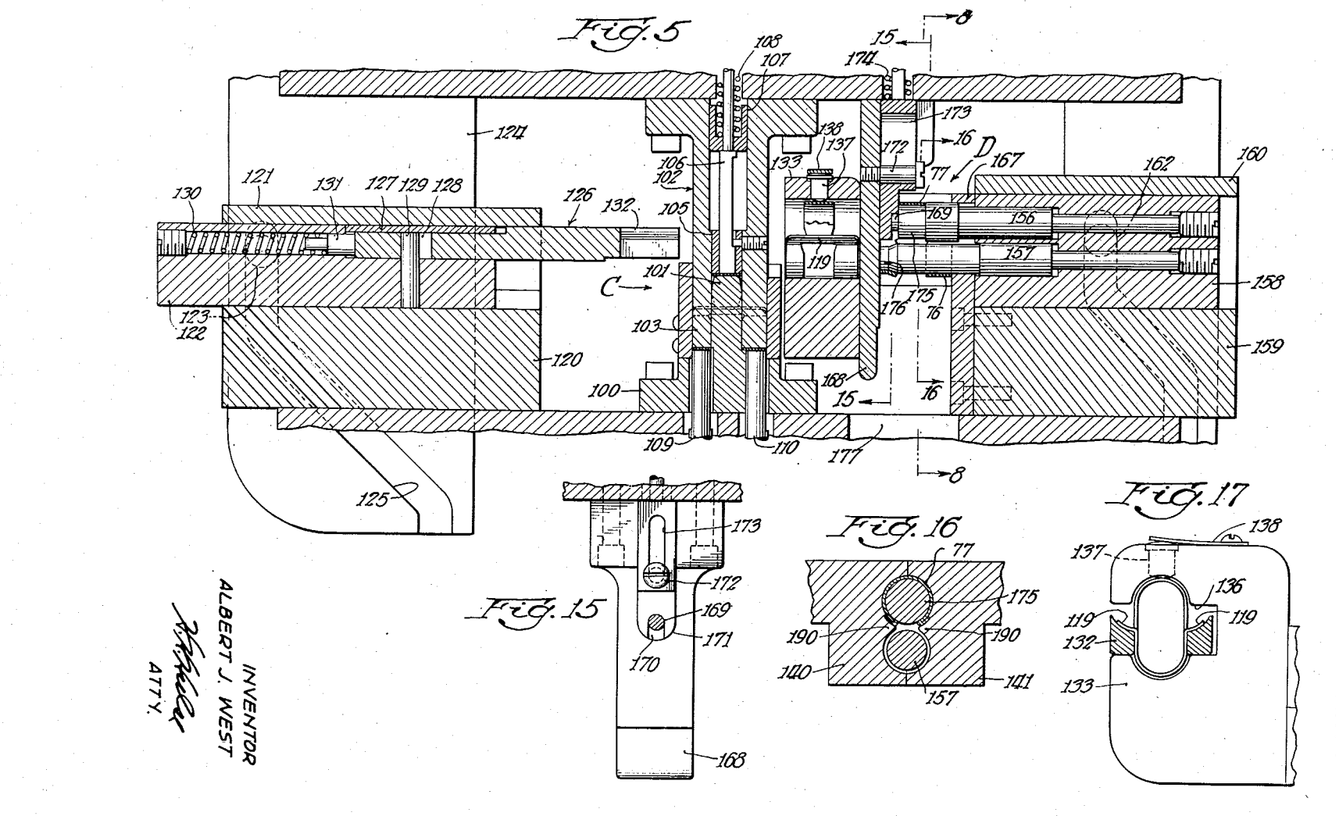
Fig. 5 is an enlarged section similar to Fig. 2, but showing the parts in their lowered position.
Fig. 15 is an elevation of the thrust plate taken along line 15—15 of Fig. 5.
Fig. 16 is a section taken along line 16—16 of Fig. 5.
Fig. 17 is a section taken along line 17—17 of Fig. 4.

A mounting block 120 having a cover plate 121 is mounted on the die bed 30 and suitably secured thereto. The upper surface of the mounting block is cut away to receive a slide block 122, these parts being shown in detail in Fig. 5. The slide block 122 carries a roller 123, projecting from one side thereof, which is engaged by a pusher cam 124, bolted on the side of the punch holder 31. The roller 123 is shown in Fig. 1, the cooperating pusher cam being broken away for purposes of clarity. As shown in Figs. 2 and 5, however, the pusher cam 124 is provided with a dog leg groove 125 for engagement with the roller 123. It will be seen that when the press descends, the slide block 122 will be retracted to the left, as viewed in Figs. 2 and 5, so that the pusher jaws 132 which are associated with the slide block 122, will be clear of the first forming station.

The pusher jaws 132 are mounted on a pusher 126, the latter being slidingly mounted in the slide block 122. The slide block is grooved to receive the pusher, and the pusher is confined within this groove by a pusher plate 127, which may be suitably bolted to the slide block 122. The pusher is provided with a slot 128, and a pin 129 is mounted in the slide block and extends into the slot 128 so that the movement of the pusher with respect to the slide block is limited. The left end of the pusher 126, as viewed in Fig. 5, is engaged by a plunger pin 131, which pin in turn is urged to the right by a spring 130, the spring and the plunger pin being received within a suitable bore in the slide block 122.

It will be seen, therefore, that on the up stroke of the press, the pusher jaws 132 will move to the right and engage a partially formed blank, and carry that blank to an intermediate station, provided by a carrier block 133. Due to the yielding mounting of the pusher 126 with respect to the slide block 122, the movement of the pusher may be blocked somewhat short of the full throw of the slide block 122, by means to be described hereinafter.

It will be noted that the pusher jaws 132 are of a shape to engage the partially formed blank, the blank being supported within the jaws by means of the flanges 119, which are shown in Figs. 5 and 17. The carrier block is provided with a recess 136, as shown in Fig. 17, which is shaped to receive both the partially formed blank and the pusher jaws. A pin 137 is slidably mounted in the carrier block above the recess, and is urged downwardly by a leaf spring 138 so that when a partially formed blank has been received within the carrier block, it will be engaged by the pin 137, with a sufficient friction as to hold it in the carrier block and permit the withdrawal of the pusher jaws 132 on the next down stroke of the press.

The carrier block 133 is mounted on a carrier slide 134, the slide in turn being slidably mounted in a block 135, suitably secured to the die bed 30.

It will be seen, therefore, that after a blank has been severed and partially formed in the first forming station C, that it is stripped from the punch and the die by plungers 106, 109 and 110, and is held by these plungers until such time as it is engaged by the pusher jaws 132 and displaced into the carrier block 133.

On the next down stroke of the press, the jaws 132 are retracted, leaving the partially formed blank in the carrier block, the jaws being retracted clear of the first forming station C into a position ready for the next operation.

Figure 8:
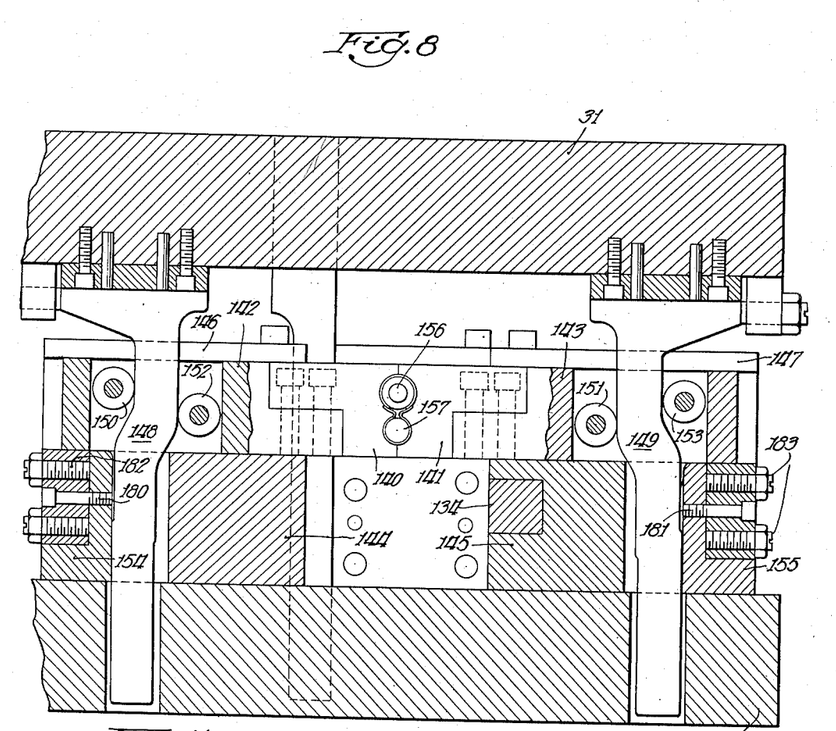
Fig. 8 is an enlarged sectional view taken along lines 8—8 of Figs. 5 and 6.

The second forming station D, which includes the forming jaws 140 and 141, is shown in plan, with the jaws in closed position, in Fig. 6. Fig. 4 shows the jaws in their open position, and Fig. 8 is a vertical section showing the jaws in their closed position. From the latter figure it will be observed that the left and right forming jaws 140 and 141 are mounted on slides 142 and 143, respectively. The slides are slidably mounted in slide blocks 144 and 145, and are confined against the slide blocks by slide block plates 146 and 147.

The slides 142 and 143 are mortised to receive dog leg cams 148 and 149, respectively, these cams being carried by the punch holder 31. The dog leg cam 148 engages rollers 150 and 152, which are mounted on pins projecting from the walls of the mortised slide block 144. Similar rollers 151 and 153 are provided in the mortised slide 143 for dog leg cam 149.

The slide blocks 144 and 145 are also mortised so that each is provided with an L-shaped recess, in which cam backings 154 and 155 are respectively disposed. As shown in Fig. 8, these backings or liners are secured in place by means of screws 180 and 181, respectively, and by pairs of adjusting studs 182 and 183, respectively.

It will be seen that as the punch descends, the slides 142 and 143, and the forming jaws 140 and 141 which are carried thereby, will move inwardly so as to impart the final form to a partially formed blank which is positioned between the forming jaws.

The forming jaws cooperate with arbors 156 and 157, which are projected into the cavity between the forming jaws at about the time the jaws come together. These arbors are mounted on an arbor slide 158, which in turn is slidably mounted on an arbor slide bearing block 159, and are confined in place by a bearing cap 160 secured to the bearing block. This arbor slide bearing block is mounted on the die bed 30 adjacent to the bearing block 135 which receives the carrier slide 134. The arbor slide 158 is shown in Fig. 4, and is provided with a recessed portion in which is disposed an arbor thrust block 161. The arbor thrust block is confined in the arbor slide by means of a pair of arbor slide plates 184, only one of which is shown in Fig. 4. It also carries a roller 162 for cooperation with the cam groove 166 (Fig. 2) formed in the arbor cam plate 165, the latter being mounted from the punch holder 31. The arbor thrust block is engaged by a plunger 163, which is pressed thereagainst by a spring 164 so that the arbor slide 158 could be said to have a yielding mounting with respect to the throw of the arbor thrust block.

A wear plate 167 is suitably secured to that surface of the arbor slide bearing block 159 from which the arbors project, the wear plate being provided with suitable apertures to accommodate the arbors. It will be seen that on the down stroke of the press, the arbors 156 and 157 will be projected through the wear plate 167 into the forming cavity, and that the motion of these arbors is limited by the striking of the arbor slide 158 against the wear plate 167. Therefore the arbors always extend through the wear plate to the same extent.

The opposite side of the forming cavity is defined by a thrust plate 168 which is carried by the punch holder 31, and against which the arbor 157 abuts. The upper arbor 156 is shorter than the arbor 157, and is provided with a reduced end portion 169 which fits into a recess 170 of a forming punch 171, this cooperation of the elements being shown in Fig. 5. The forming punch is slidably mounted on the thrust plate 168 by suitable means including a screw 172 which extends through a slot 173 in the forming punch and takes into the thrust plate 168. The forming punch 171 is backed by a spring 174 which is received in the punch holder 31.

The forming punch 171 engages the wings or flanges 119 of the partially formed blank in a manner so as to prevent their caving in when the loop 78 is deformed by the forming jaws 140 and 141. It will be noted that the upper arbor 156 is provided with an enlarged portion 175 which cooperates with the side surface of the forming punch 171 to confine the edges of the intermediate loop 77 as it is being deformed by the forming jaws. The end of the arbor 157 is provided with a reduced portion 176 so that the loop 78 will be somewhat smaller than the loop 76, on the finished article as shown in Fig. 20. The loop 78 is somewhat tapering so as to receive the reduced forward portion of a machine gun cartridge. In essence, therefore, the forming cavity of the second forming station D is bounded by the forming jaws 140 and 141 at the sides, and at the ends by the thrust plate 168 and the wear plate 167. However, for the middle loop 77, the ends of the forming cavity are bounded by the side surface of the forming punch 171 and by the enlarged portion 175 on the upper arbor 156. These parts cooperate with each other to deform the partially formed blank as shown in Fig. 19 into the finished cartridge belt link shown in Fig. 20. As the forming jaws and the thrust plate are withdrawn, on the upstroke of the press, the finished article drops through slot 177 in the die bed 30, and through a corresponding slot, not shown, in the bolster plate 34, into a suitable container, not shown.

As indicated above, the carrier slide 134 is received in a block 135, and, as shown in Fig. 4, a yielding mounting is provided for the carrier slide so as to urge the carrier block 133 away from the second forming station D. This yielding mounting consists of a spring 186 disposed in a bore in the carrier slide, and which at its outer end bears against a spring plunger 185. A spring plate 187 is bolted to the block 135, against which plate the spring plunger reacts.

The pusher slide 122 is provided, as shown in Fig. 4, with a lug 188 in which is mounted an adjusting screw 189. The adjusting screw is positioned so that it will contact the carrier block 133 as the pusher jaws 132 move into the carrier block, and thereby to cause displacement of the carrier block. This action takes place on the up stroke of the press, after the thrust plate 168 has been withdrawn so that the carrier block is then moved over adjacent the forming cavity. The partially formed blank which is received between the pusher jaws 132 engages the partially formed blank already in the carrier block 133 so that the movement of the pusher jaws into the carrier block will cause displacement of the partially formed blank already in the carrier block into the forming cavity wherein it may be engaged by the forming jaws on the next down stroke of the press. The partially formed blank is held in place in the forming cavity by engagement of the flanges 119 with the ridge portions 190 of the forming jaws 140 and 141. These portions are shown in Fig. 16.

On the down stroke of the press, as the pusher is retracted, the carrier slide spring 186 causes the carrier to be separated from the jaws so as to leave a gap for the reception of the thrust plate 168. The pusher spring 130 provides a resilient mounting for the pusher jaws 132 so as to insure that the partially formed blank which has been displaced into the forming cavity, is correctly positioned in contact with the wear plate 167.

The operation of the tool has been described in detail in connection with the operation of the various parts thereof. Its operation as a whole can best be described with reference to Fig. 4.

The strip stock 39, as it passes through the piercing station A, is guided and centered by the stock guides 65 and 66, and their associated strip equalizers 70 and 71, so that the notches 74 and the tear drop hole 75 will be punched in the proper positions. As the strip is then advanced into slit and cut-off station B, the strip is centered between pilot pins 93, so that it will be slit in the proper position. The slitting operation causes each separate blank to be slit into three portions, 76a, 77a and 78a. The middle portion 77a is offset downwardly, whereas the subsequent forming of these portions into loops takes place in the opposite direction, so that all burs will be on the outside of the loops, where they will not damage the machine gun cartridges.

As the strip is next advanced into the first forming station C, and formed into the partially formed blank shown in Fig. 19, that particular blank is severed from the succeeding portion of the strip by means of the cut-off punch 97. After this first forming operation, the partially formed blank is removed from the first forming station C into the carrier block 133, by means of the pusher mechanism. The preceding partially formed blank which had formerly been held in the pusher block, is at the same time forced into the second forming station D. On the next down stroke of the press, the carrier block 133 is removed, thereby permitting the thrust plate 78 to close the gap between the carrier block and the forming jaws 140 and 141, and then as the forming jaws move into operative position, the arbors 156 and 157 are projected through the wear plate 167 into the forming cavity, so that the finished article may be properly formed. On the up stroke of the press, the arbors are then retracted, and as the forming jaws are retracted, the finished article, as shown in Fig. 20, is released and drops through the press.

It will be noted that all of the necessary apparatus is contained within the confines of the die bed 30 and the punch holder 31, with the exception of the bolster pins 111 and 112, which are received within the bolster plate 34, and their associated parts, which are disposed within the bolster housing 115. However, the bolster pins 111 and 112, being separate from the plungers 109 and 110, it will be seen that the die set may be slid off the bolster plate, and thereby easily removed from the press or set up in position.

In the appended claims, the term "expanding" refers to the forming step whereby one of the longitudinally disposed portions of a slitted blank is looped in one direction, and another of said longitudinally disposed portions is looped in an opposite direction, the connecting end portions occupying an intermediate position between said loops. The term "expanded blank" refers to the slitted blank after the expanding operation.

Although only a preferred embodiment of this invention has been shown, it is apparent that various modifications and changes may be made in the apparatus and method herein disclosed without departing from the spirit of this invention. The foregoing description and the drawings are deemed to be illustrative only and the invention is to be limited only by the appended claims.

I claim:

1. A method for making a cartridge belt link from strip stock comprising the steps of advancing the strip stock step by step along a line of feed, forming a blank therefrom as it passes a predetermined point, slitting a said blank so as to provide a plurality of longitudinally disposed parallel portions which are connected to each other at both of their ends, severing said blank from said strip, applying forming pressure to adjacent portions of said slitted blank in opposite directions so as to expand the same into a partially formed blank having oppositely disposed loop portions, translating said partially formed blank into an intermediate position at right angles to the line of feed where it may be engaged by a succeeding blank and be displaced by said succeeding blank into a final forming position, and subjecting said partially formed blank to a second forming operation wherein the forming pressure is applied in a different direction than the forming pressure applied in the first forming operation.

2. In an apparatus adapted to form sheet metal articles from intermittently advancing strip stock, the combination of a die set having cooperating punch and die members disposed along the path of said intermittently advanced strip for performing preliminary blanking operations thereon, first forming means disposed in the path of said strip for simultaneously severing a blanked portion therefrom and for partially forming the same, second forming means disposed to one side of said first forming means for further forming the partially formed blank, said second forming means including a pair of transversely sliding jaws for imparting forming pressure to said partially formed blank in a different direction than the forming pressure imparted thereto in said first forming means, and including a retractable mandrel mounted between said sliding jaws, and means for removing said partially formed blank from said first forming means and for advancing the same to said second forming means, and separate cam means operable upon compression of said die set for actuating said sliding jaws, said retractable mandrel, and said blank advancing means.

3. In an apparatus for making a sheet metal article of the class described, means for slitting a blank so as to provide a plurality of parallel longitudinally disposed portions having common end portions by means of which they are connected together, means for forming alternate portions into aligned loops axially spaced from one another, and for forming an intermediate portion into a loop extending in the opposite direction, said common end portions forming projecting wings, two die members provided with forming die surfaces thereon and mounted for sliding movement toward and away from each other for squeezing said projecting wings of said partially formed blank toward each other, an arbor disposed between said die members to serve as a mandrel, and means to retract said arbor axially from said link so as to permit said link to drop clear of said jaws as they open.

4. In a progressive tool for making cartridge belt links or the like, means for slitting a blank so as to provide a plurality of parallel longitudinally disposed portions having common end portions by means of which they are connected together, means for expanding said slitted blank, two die members provided with forming die surfaces thereon and mounted for sliding movement toward and away from each other for squeezing said expanded blank in order to impart the final link form thereto, an arbor disposed between said die members to serve as a mandrel, means to retract said arbor axially from said link so as to permit said link to drop clear of said jaws as they open, and means to advance said expanded blank from said expanding means to a position wherein it will be engaged by said two die members.

5. Apparatus for forming a cartridge belt link or the like comprising a punch holder from which project downwardly a slitting punch, a forming punch, and three dog-leg cams, a die bed including cooperating die members for said slitting and forming punches, two transversely sliding jaws mounted on said die bed and operated by two of said dog-leg cams, and a pusher operated by said third dog-leg cam for removing a partially formed blank from beneath said forming punch on the up stroke thereof and for displacing it into an intermediate position from which said blank may subsequently be displaced into a second position between said two transversely sliding jaws, said jaws having forming die surfaces thereon to impart the final shape to said partially formed blank.

6. Apparatus for forming a cartridge belt link or the like comprising a punch holder from which project downwardly a slitting punch, a forming punch, and three dog-leg cams, a cooperating die bed, means on said die bed cooperating with said slitting and forming punches for effecting preliminary blanking and forming operations on said blank, two transversely sliding jaws mounted on said die bed and operated by two of said dog-leg cams, and a pusher operated by said third dog-leg cam for removing a partially formed blank from beneath said forming punch on the up stroke thereof and for displacing it into an intermediate position from which said blank may subsequently be displaced by a succeeding blank into a second position wherein said first mentioned blank will be engaged by said two transversely sliding jaws, said jaws having forming die surfaces thereon.

7. A progressive tool in the form of a die set having two forming stations, a retractable slide member for advancing a partially formed blank from one forming station to the other, means actuated by the operation of said die set for retracting said slide member on the down stroke thereof so that said slide member clears said first forming station, and for advancing the same on the up stroke thereof so as to remove a partially formed blank from said first forming station, means adapted to receive the end of said slide member in its advanced position and to engage the partially formed blank carried thereby and to hold the same after said slide member has been retracted, said last named means being adjacent said second forming station so that the blank held thereby may be ejected from said means into said second forming station by a subsequent operation of said slide member.

8. A progressive tool for operation on intermittently advanced strip stock in the form of a die set having a blanking station and a first forming station disposed in the path of said strip and a second forming station disposed at one side of said first forming station, said first forming station including means for severing a blanked portion from said strip and for partially forming the same, a retractable slide member for advancing a partially formed blank from said first forming station to the second, cam means for retracting said slide member on the down stroke of said die set, and for advancing the same on the up stroke thereof so as to engage a partially formed blank at said first forming station, a carrier adapted to receive the end of said slide member in its advanced position and to engage the partially formed blank carried thereby and to hold the same within said carrier after said slide member has been withdrawn, said carrier being adjacent said second forming station so that the blank held thereby may be ejected from said carrier by a subsequent operation of said slide member into said second forming station.

9. Apparatus for forming a cartridge belt link or the like comprising a die set having a die bed and a cooperating punch holder, means to expand a sheet metal blank, two forming jaws spaced from said expanding means and slidingly mounted with respect to said die bed, cam means carried by said punch holder to actuate said jaws, a mandrel for said jaws slidingly mounted with respect to said die bed, cam means carried by said punch holder to cause reciprocation of said mandrel into and out of the space between said jaws, a carrier block disposed between said expanding means and said jaws and provided with a cavity aligned with the space between said jaws, pusher means for moving an expanded blank from said expanding means into said cavity, means associated with said carrier block by means of which an expanded blank may be held in said cavity after retraction of said pusher means, and cam means carried by said punch holder for actuation of said pusher means, whereby the expanded blank held in said cavity may be displaced into the space between said jaws by a succeeding expanded blank as the latter is moved into said cavity by said pusher means.

10. Apparatus for forming a cartridge belt link or the like comprising a die set having a die bed and a cooperating punch holder, strip slitting means and blank severing and expanding means incorporated in said die set and arranged to operate on intermittently advanced strip stock to form an expanded blank, two forming jaws spaced from said expanding means and slidingly mounted with respect to said die bed, means carried by said punch holder to cause said forming jaws to slide towards each other on the down stroke of said punch holder, to impart the desired configuration to an expanded blank disposed therebetween, a plate disposed along one side of said forming jaws, an arbor slidingly mounted in said plate, cam means carried by said punch holder to cause said arbor to be projected through said plate into the space between said forming jaws to form a mandrel for said expanded blank, a thrust plate carried by said punch holder in a position to engage the opposite side of said forming jaws as said punch holder descends, said thrust plate and said first mentioned plate cooperating with said forming jaws to form a cavity, a carrier block normally spaced from the latter mentioned side of said forming jaws, and adapted to be displaced into contact with the sides of said forming jaws when said punch holder is in an elevated position, said carrier block being provided with a second cavity forming a continuation of said first mentioned cavity, means associated with said carrier block to hold an expanded blank in said second cavity, transversely sliding means for moving an expanded blank from said severing and expanding means into said second cavity, thereby displacing the expanded blank previously disposed therein into said first mentioned cavity, and means carried by said punch holder for actuation of said last named means.

11. Apparatus for forming a cartridge belt link comprising a die set having a die bed and a cooperating punch holder, two transversely sliding jaws mounted on said die bed, cam means carried by said punch holder to cause said jaws to slide into contact with each other on the down stroke of said punch holder, the end faces of said jaws being shaped to impart the desired configuration to a partially formed blank disposed therebetween, a plate disposed along one side of said jaws, an arbor slidingly mounted in said plate, cam means carried by said punch holder to cause said arbor to be projected through said plate into the space between said jaws to form a mandrel, a thrust plate carried by said punch holder in a position to engage the opposite side of said jaws as said punch holder descends, said thrust plate and said first mentioned plate cooperating with said jaws to form a cavity, a carrier block normally spaced from the latter mentioned side surfaces of said jaws to permit the interposition of said thrust plate between said carrier block and said jaws, and adapted to be displaced into contact with the sides of said jaws when said thrust plate is in an elevated position, means associated with said carrier block for engaging a partially formed blank and holding same in a position adjacent said cavity when said thrust plate is in elevated position, transversely sliding means to eject said blank from said carrier block into said cavity, and cam means carried by said punch holder for actuation of said ejecting means.

12. A method of making a cartridge belt link or the like including the steps of slitting a sheet metal blank by forcing a portion out of the plane of said blank in one direction and then expanding said slitted blank by forcing said portion through the plane of said blank in the opposite direction whereby any burs resulting from the slitting operation are on the outside of the loops resulting from the expanding operation.

13. A method of making a cartridge belt link or the like including the steps of slitting a sheet metal blank by forcing a central portion below the surface of the remainder of the blank and then expanding said slitted blank by forming said central portion above the remainder of said blank and forming an adjacent portion below the remainder of said blank whereby any burs resulting from the slitting operation are on the outside of the loops resulting from the forming operations.

ALBERT J. WEST.

REFERENCES CITED

The following references are of record in the file of this patent:

UNITED STATES PATENTS

| Number | Name | Date |
| --- | --- | --- |
| 1,556,528 | Locke | Oct. 6, 1925 |
| 2,266,997 | Sherman | Dec. 23, 1941 |
| 2,347,930 | Borton | May 2, 1944 |
| 2,355,964 | Fernlund et al. | Aug. 15, 1944 |
| 2,355,992 | Moinichen | Aug. 15, 1944 |
| 2,357,558 | Sherman | Sept. 5, 1944 |